(12) United States Patent
Shilton (10) Patent No.: US 11,390,539 B2
(45) Date of Patent: Jul. 19, 2022

(54) LIQUID TREATMENT METHOD AND APPARATUS

(71) Applicant: Novolabs Limited, Palmerston North (NZ)

(72) Inventor: Andrew Nicholas Shilton, Palmerston North (NZ)

(73) Assignee: Novolabs Limited, Palmerston North (NZ)

( * ) Notice: Subject to any disclaimer, the term of this patent is extended or adjusted under 35 U.S.C. 154(b) by 888 days.

(21) Appl. No.: 16/065,359

(22) PCT Filed: Dec. 12, 2016

(86) PCT No.: PCT/NZ2016/050196
§ 371 (c)(1),
(2) Date: Jun. 22, 2018

(87) PCT Pub. No.: WO2017/111616
PCT Pub. Date: Jun. 29, 2017

(65) Prior Publication Data
US 2021/0163315 A1    Jun. 3, 2021

(30) Foreign Application Priority Data

Dec. 23, 2015  (NZ) .................................... 715527
May 5, 2016    (NZ) .................................... 719796

(51) Int. Cl.
*C02F 1/32*       (2006.01)
(52) U.S. Cl.
CPC ...... *C02F 1/325* (2013.01); *C02F 2201/3221* (2013.01); *C02F 2201/3222* (2013.01);
(Continued)

(58) Field of Classification Search
CPC .............. C02F 1/325; C02F 2201/3221; C02F 2201/3222; C02F 2201/3227;
(Continued)

(56) References Cited

U.S. PATENT DOCUMENTS 3,659,096 A    4/1972  Kompanek
3,837,800 A    9/1974  Meltzer
(Continued)

FOREIGN PATENT DOCUMENTS

AU    736149    7/1998
AU    761277    7/2000
(Continued)

OTHER PUBLICATIONS

Lu, Gang, et al., UV inactivation of microorganisms in beer by a novel thin-film apparatus, 2010, Food Control, 21, 1312-1317. (Year: 2010).*

(Continued)

*Primary Examiner* — Bradley R Spies
*Assistant Examiner* — Jeannie McDermott
(74) *Attorney, Agent, or Firm* — Merchant & Gould P.C.

(57) ABSTRACT

A method and apparatus for treating a liquid using ultraviolet radiation. A thin flow of liquid in a supercritical flow is irradiated by at least one radiation source external to the thin flow. The flow may desirably have a Froude number greater than 3 and a velocity greater than 0.8 m/s. The apparatus for treating a liquid including may have a reservoir supplying liquid though a slot into an open channel to generate a thin flow of liquid having a supercritical flow along the channel with at least one radiation source external to the thin flow to irradiate the thin flow.

37 Claims, 5 Drawing Sheets (52) U.S. Cl.
CPC .. *C02F 2201/3227* (2013.01); *C02F 2209/40* (2013.01); *C02F 2301/02* (2013.01); *C02F 2303/04* (2013.01)

(58) Field of Classification Search
CPC .............. C02F 2209/40; C02F 2303/04; C02F 2103/001; C02F 2201/3228
See application file for complete search history.

(56) References Cited

U.S. PATENT DOCUMENTS

| | | | |
|---|---|---|---|
| 4,825,083 A * | 4/1989 | Latel | C02F 1/325 |
| | | | 250/435 |
| 5,247,178 A | 9/1993 | Ury et al. | |
| 5,494,576 A | 2/1996 | Hope | |
| 5,766,489 A | 6/1998 | Jena | |
| 5,780,860 A * | 7/1998 | Gadgil | A61L 2/10 |
| | | | 250/432 R |
| 6,015,229 A | 1/2000 | Cormack et al. | |
| RE36,896 E * | 10/2000 | Maarschalkerweerd | |
| | | | C02F 1/325 |
| | | | 422/186.3 |
| 6,139,726 A | 10/2000 | Greene | |
| 6,193,681 B1 | 2/2001 | Davidner et al. | |
| 6,576,189 B1 | 6/2003 | Wedekamp | |
| 6,715,498 B1 | 4/2004 | Humayun et al. | |
| 6,780,475 B2 | 8/2004 | Fulton et al. | |
| 6,803,586 B1 | 10/2004 | Brunet et al. | |
| 6,905,555 B2 | 6/2005 | DeYoung et al. | |
| 7,371,323 B1 | 5/2008 | Spielman | |
| 8,080,165 B2 | 12/2011 | Forney | |
| 8,088,289 B2 | 1/2012 | Tribelsky | |
| 8,632,728 B2 | 1/2014 | Shim | |
| 8,663,471 B1 | 3/2014 | Barry et al. | |
| 8,742,364 B2 | 6/2014 | Boodaghians et al. | |
| 8,742,366 B2 | 6/2014 | Snowball | |
| 8,758,630 B1 | 6/2014 | Britenstine | |
| 8,858,892 B2 | 10/2014 | Clark | |
| 8,859,987 B2 | 10/2014 | Clark | |
| 2002/0100679 A1 | 8/2002 | Wedekamp | |
| 2006/0249464 A1 | 11/2006 | Conger et al. | |
| 2007/0045561 A1 | 3/2007 | Cooper | |
| 2009/0250407 A1 * | 10/2009 | Delano | C02F 9/00 |
| | | | 210/748.12 |
| 2012/0097862 A1 | 4/2012 | Snowball | |
| 2015/0275166 A1 | 10/2015 | Feris et al. | |

FOREIGN PATENT DOCUMENTS

| | | |
|---|---|---|
| CN | 1552633 | 12/2004 |
| CN | 1557731 | 12/2004 |
| CN | 101535793 A | 9/2009 |
| CN | 101580289 | 11/2009 |
| CN | 102452698 | 5/2012 |
| DE | 4005488 A1 | 8/1991 |
| DE | 698 23 106 | 12/2004 |
| DE | 20 2008 017 944 | 12/2010 |
| EP | 0 444 530 | 9/1991 |
| EP | 0 686 601 | 12/1995 |
| EP | 0 893 411 | 1/1999 |
| EP | 1 678 085 | 4/2010 |
| EP | 2 399 614 | 12/2011 |
| FR | 2 442 218 | 6/1980 |
| FR | 2 607 129 | 5/1988 |
| FR | 2 760 445 | 9/1998 |
| KR | 10 120 0003 | 11/2012 |
| WO | 00/68152 | 11/2000 |
| WO | 01/54739 | 8/2001 |
| WO | 01/66469 | 9/2001 |
| WO | 01/83385 | 11/2001 |
| WO | 03/035145 | 5/2003 |
| WO | 03/095369 | 11/2003 |
| WO | 2004/000735 | 12/2003 |
| WO | 2006/106363 | 10/2006 |
| WO | 2009/058681 | 5/2009 |
| WO | 2011/105911 | 9/2011 |
| WO | 2015/086592 | 6/2015 |
| WO | 2015167395 A1 | 11/2015 |

OTHER PUBLICATIONS

European Search Report for EP Application No. 16879448.5 dated Jul. 4, 2019 (9 pages).
Wikipedia—Froude Number retrieved Apr. 13, 2017—http://en.wikipedia.org/wiki/Froude_number (7 pages).
Masschelein. "Ultraviolet Light in Water and Wastewater Sanitation." Lewis Publishers, (2002) pp. 70-73.
Shama et al. "A Novel Thin Film Photoreactor." J. Chem. Tech. Biotechnol. vol. 65, 1996, pp. 56-64.
Havelaar et al. "F-Specific Bacteriophages as Indicators of the Disinfection Efficiency of Secondary Effluent with Ultraviolet Radiation." Ozone Science & Engineering, vol. 9, 1987, pp. 353-368.
International Search Report for International Application No. PCT/NZ2016/050196 dated Mar. 28, 2017 (5 pages).
International Written Opinion for International Application No. PCT/NZ2016/050196 dated Mar. 28, 2017 (5 pages).
WEDECO LBX Series Brochure: The Ideal UV Solution When Wastewater is Under Pressure, 2013, 4 pages.
Gisborne WWTP UV Sampling Summary Report CH2M Baca Limited, Aug. 27, 2012, 10 pages.

\* cited by examiner

LIQUID TREATMENT METHOD AND APPARATUS

This application is a National Stage Application of PCT/NZ2016/050196, filed 12 Dec. 2016, which claims benefit of Serial No. 715527, filed 23 Dec. 2015 and Serial No. 719796, filed 5 May 2016 in New Zealand and which applications are incorporated herein by reference. To the extent appropriate, a claim of priority is made to each of the above disclosed applications.

FIELD

This invention relates to a method and apparatus for treating a liquid using ultraviolet radiation.

BACKGROUND

Ultraviolet radiation is known to be an effective germicidal agent. Currently, applications utilising ultraviolet light treatment include the disinfection of liquids.

Systems employing UV radiation sources provided in quartz tubes within a flow of liquid to be treated are widely employed. Any system where the ultraviolet radiation source is submerged in the liquid has electrical connection and associated waterproofing complexities. These systems also typically require a quartz barrier to protect the ultraviolet light source from the liquid, with the barrier absorbing some of the ultraviolet radiation and reducing the overall efficiency. These quartz tubes also require periodic cleaning. These complexities add to the cost of constructing and maintaining prior art systems. Pressure losses are also incurred due to the friction of the flow against the walls of reactor and the walls of the quartz tubes. This may be quite significant if the spacing between tubes within the reactor is decreased to improve treatment in liquids of low transmissivity, as wetted surface area and, for a given liquid flow rate, the velocity increase with decreased tube spacing.

To achieve an acceptable degree of disinfection of a liquid, a suitable dose of ultraviolet radiation must be delivered to the liquid. The dose delivered to the liquid is defined as the product of the ultraviolet radiation intensity and the duration in which the liquid is exposed to the ultraviolet radiation, which is also known as the retention time.

When using ultraviolet radiation to treat liquids, it is important to note that the liquid may contain material that discolours, obscures and/or clouds it. Such material reduces the transmissibility of the ultraviolet radiation through the liquid, resulting in reduced ultraviolet radiation intensity in the liquid. Because of this, the effectiveness of treatment is reduced.

The dose level may be thus increased by increasing the retention time, the light intensity or both retention time and light intensity.

A higher retention time in an ultraviolet light liquid treatment system can be achieved by reducing the flow rate of the liquid while it is irradiated by ultraviolet radiation. As a consequence, the overall flow capacity of the system is reduced.

Alternatively, to obtain a higher dose, the intensity of the radiation can be increased. One simple method to increase the intensity of ultraviolet radiation in the liquid to be treated would be to increase the initial intensity that is radiated at the source. By way of example, this could be achieved by employing a greater number of ultraviolet radiation sources and/or higher powered ultraviolet radiation sources. However, systems that employ this method have the disadvantage of higher capital and operating costs.

Instead of increasing intensity, the properties of the liquid can be altered to obtain an increase in radiation intensity within the liquid. One possible alteration is a reduction in the depth or thickness of the liquid being irradiated. In WO00/68152 the thickness of the liquid to be treated is reduced by directing the liquid into a cylindrical housing in which is positioned a tubular ultraviolet radiation source. Since there is only a small radial gap between the cylindrical housing wall and the tubular ultraviolet radiation source, the liquid flows along the ultraviolet radiation source as a thin flow. However, to maintain treatment capacity in a thin flow, it is necessary to increase the speed that the liquid flows through the system at. As the system is enclosed and has a large surface area in contact with the liquid relative to the volume of the liquid in the system, the increased speed creates a high degree of friction and so a greater driving pressure is required, requiring for example larger pumps and higher operating costs.

A shallow bed reactor design has also been proposed for the purpose of determining lethal doses for sample liquids. This reactor produces a thin liquid flow flowing over a bed that is exposed to UV radiation. This is only proposed for the purpose of testing rather than full scale treatment. Furthermore, the slope of the bed is relatively flat and the entry of liquid to the bed is not constrained such as to allow high liquid flow rates and thin depths suitable for commercial treatment.

Other thin flow systems have been proposed. WO2006106363 suggests the use of a revolving drum that picks up liquid in a thin film as it rotates. The throughput for this system is low. Other systems suggest a thin falling film, including U.S. Pat. No. 3,659,096 and Shama et al. in J. Chem Tech. Biotechnol. 1996, 65, 56-64. These systems have a large size requirement relative to the volume of liquid being treated due to limited flow rates through the systems. In these systems, it may also be difficult to maintain an even sheet of liquid, resulting in uneven treatment.

It is an object of the invention to provide an improved method and apparatus for treating a liquid with ultraviolet radiation or to at least provide the public with a useful choice.

SUMMARY OF THE INVENTION

According to one example embodiment there is provided a method of treating a liquid comprising the steps of:
i. generating a thin flow of the liquid in a supercritical flow, having a Froude number greater than 3; and
ii. irradiating the thin flow using at least one radiation source external to the thin flow.

According to another example embodiment there is provided a method of treating a liquid comprising the steps of:
i. generating a thin flow of the liquid in a supercritical flow, having a depth less than 6 mm; and
ii. irradiating the thin flow using at least one radiation source external to the thin flow.

According to a further example embodiment there is provided a method of treating a liquid comprising the steps of:
i. generating a thin flow of the liquid in a supercritical flow, having a velocity greater than 0.8 m/s; and
ii. irradiating the thin flow using at least one radiation source external to the thin flow.

According to another example embodiment there is provided an apparatus for treating a liquid including:

i. a liquid source;
ii. an open channel;
iii. a slot, having a height of 6 mm or less, from the liquid source to the open channel configured to generate a thin flow of liquid having a supercritical flow along the channel; and
iv. at least one radiation source external to the thin flow to irradiate the thin flow.

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e., they will be taken to mean an inclusion of the listed components which the use directly references, and possibly also of other non-specified components or elements.

Reference to any document in this specification does not constitute an admission that it is prior art, validly combinable with other documents or that it forms part of the common general knowledge.

BRIEF DESCRIPTION OF THE DRAWINGS

The accompanying drawings which are incorporated in and constitute part of the specification, illustrate embodiments of the invention and, together with the general description of the invention given above, and the detailed description of embodiments given below, serve to explain the principles of the invention, in which.

DETAILED DESCRIPTION

The invention will be described by way of examples employing ultraviolet (UV) radiation but it is to be appreciated that in appropriate circumstances that other forms of radiation may be employed. As light intensity decreases exponentially as it penetrates a liquid a system having a thin flow of liquid is desirable due to the increased efficiency and ability to treat contaminated or occluded liquids with low UV light transmissibility. To maintain treatment capacity, the speed at which the liquid flows through the system must be increased. However, pressure losses due to friction need to be minimised to avoid excessively increasing capital and operating costs.

Figure 1:
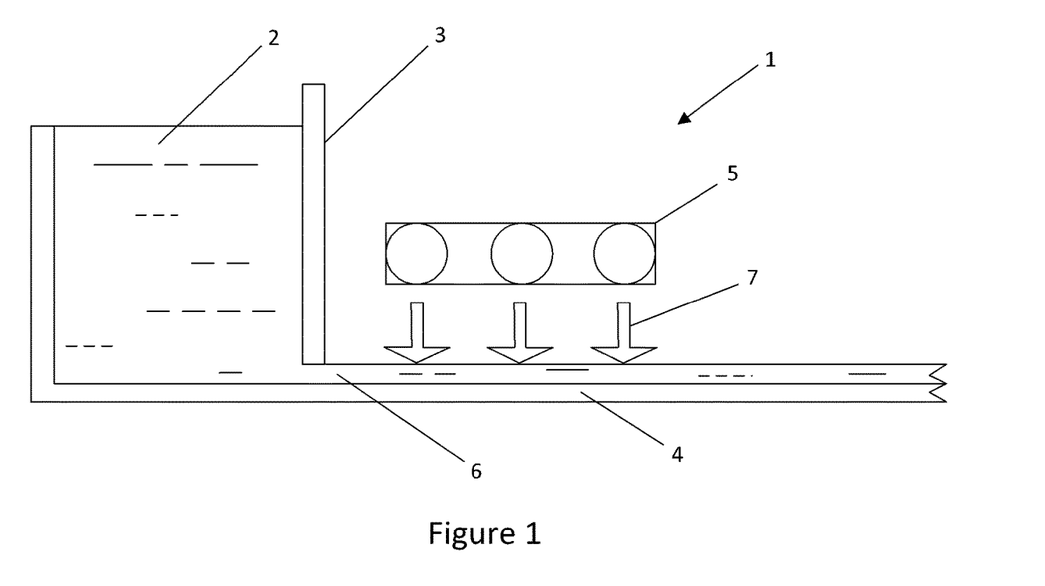
FIG. 1 is a cross-sectional side view of a liquid treatment apparatus according to one embodiment.

FIG. 1 shows a liquid treatment apparatus 1 according to an exemplary embodiment. The source 2 of a liquid to be treated may be a header tank or other reservoir that maintains a gravity liquid pressure that provides the driving energy for the flow exiting 2. A gate 3 is used to restrict the flow of liquid exiting from source 2 to generate a substantially thin flow of the required depth and flow rate. The gate 3 may be a sluice gate, slot, valve or any other suitable means for reducing or controlling the flow of including any suitable arrangement of one or more apertures in a barrier may be employed. Maintaining a thin flow increases the effective dose of ultraviolet radiation provided to the liquid, as the UV radiation is more effectively delivered to the flow due to reduced attenuation by the liquid layer compared to traditional systems. To maintain treatment capacity, as the depth of the system is decreased relative to prior art systems, it is necessary to create the thin flow with a relatively high velocity.

The channel 4 that the liquid flows in is enclosed by a bottom face and two side faces, leaving the top face open, or at least not in contact with the liquid. The open channel design also allows the arrangement of one or more ultraviolet radiation sources 5 along the open top face of the channel. The ultraviolet radiation sources 5 may be spaced at a distance from the liquid so that they are unlikely to come into contact with it and become fouled. Such a system may not require the quartz shield necessary in prior art systems, although it may be useful in some applications.

The gate 3 creates a small opening in the form of a slot between the gate and base of the channel 4. This allows a thin flow 6 of liquid to flow out of the source 2. It may encompass manual or automatic adjustment of the height of the slot. Depending upon the application and the properties of the liquid to be treated, it may be beneficial to configure the gate 3 to operate with a slot height of less than 4 mm. A depth of about 2 mm has been tested and found to be effective for treatment of a range of municipal wastewater effluents. Shallower depths such as 1 mm or less may be employed in cases where the liquid to be treated has such low light transmissibility that the treatment benefit of further reducing depth warrants the higher pressure requirement to expel the same volume of liquid through this smaller gap (or for a given pressure warrants the flow rate reduction for a given treatment unit). Greater thicknesses up to say 6 mm may be warranted if higher throughput is sought and if the transmissibility allows the treatment objective to be meet more economically than at 2 mm A high velocity flow of a liquid may be created by storing the liquid in a reservoir as shown in FIG. 1 and exploiting its gravitational potential energy by locating the gate 3 at the bottom of the reservoir. This apparatus is analogous to a dam in a river. When the gate 3 is opened, the liquid will be discharged at a relatively high velocity. To maximise the conversion of gravitational potential energy of the liquid to high velocity kinetic energy, the gate 3 is preferably a narrow slot. Depending on the application of the liquid treatment apparatus and properties of the liquid to be treated, it may be beneficial to configure the velocity to be greater than 0.8 m/s, greater than 1 m/s or greater than 2.5 m/s.

Alternative embodiments of the invention may utilise a pump, or other mechanical device, to provide the required pressure. Regardless of the means of generating the high velocity flow, the gate 3 ensures that the depth is maintained at a range of flow rates.

It has been found that to achieve a sufficient throughput whilst ensuring adequate treatment that a supercritical flow should be employed. A supercritical flow is rapid and shallow and is defined as set out below.

The Froude Number of a flow is defined as:

$$Fr = \frac{v}{\sqrt{yg}}$$

Where:
Fr=the Froude number
v=velocity of flow (m/s)
y=depth of flow (m)
g=acceleration due to gravity (m/s$^2$)

By definition, Fr must be greater than 1 for a flow to be in a supercritical state. For commercially competitive operation it has been found advantageous to operate the treatment system where the thin flow has a Froude number is greater than 3. Depending on the application for the liquid treatment apparatus and the properties of the liquid being treated it may be beneficial to configure the flow to have a Froude number of greater than 3, greater than 5 or greater than 10.

By manipulating the Froude Number equation, $v=Fr\sqrt{yg}$

Since Fr>1, for a specific depth of flow y, the supercritical flow velocity must be:

$$v > \sqrt{yg}$$

Given a specific depth for the thin flow 6, it is possible to calculate the flow velocity required and vice versa at which supercritical flow conditions prevail.

It is likely that in systems such as this with high velocity flow that the flow will be turbulent, rather than a lower velocity laminar or transitional flow. In experiments comparing these with turbulent flow, the treatment performance was superior for turbulent flow. However, any type of flow is likely to be treated with superior efficiency using a thin flow.

Once the thin flow 6 flows through the gate 3, the treatment process begins. The ultraviolet radiation sources 5 may be a plurality of tubular ultraviolet light bulbs with reflectors to direct as much of the radiation into the liquid to be treated as possible. The tubes may be arranged transverse to the direction of flow. If sufficient tubes are provided to ensure a sufficient dosage when all but one tube working (or more if greater redundancy is required) then the arrangement ensures that the liquid is sufficiently treated even if one bulb fails and it may be replaced whilst treatment continues. For maximum efficiency the one or more redundant bulbs may only be driven when one or more active bulbs fails.

Figure 2:
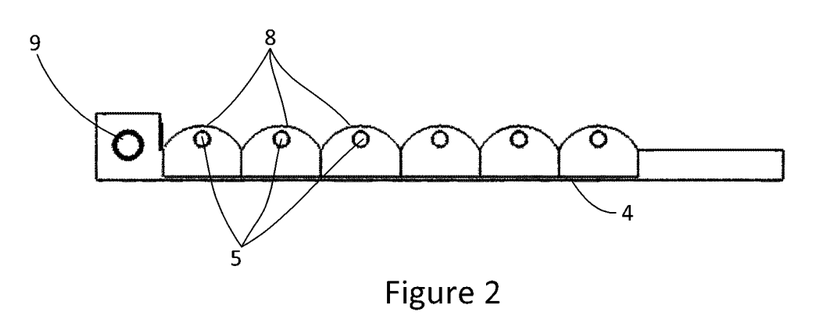
FIG. 2 is a cross-sectional side view of a liquid treatment apparatus according to another embodiment.
Figure 3:
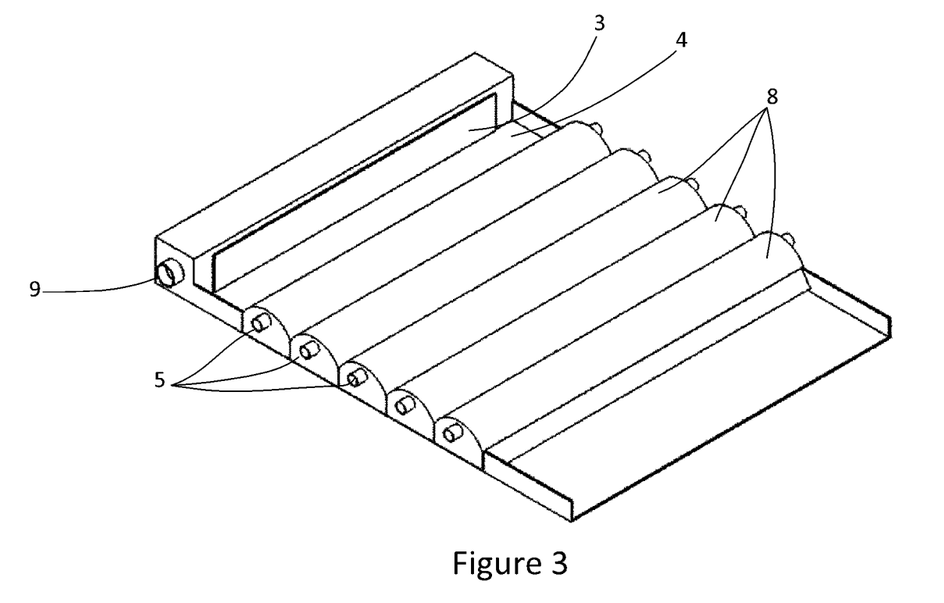
FIG. 3 is a perspective view of the liquid treatment apparatus shown in FIG. 2.

FIGS. 2 and 3 show a system having a series of parabolic reflectors 8 surrounding the individual ultraviolet light bulbs 5 (the first bulb and reflector have been removed from FIG. 3 so that the gate is visible). The purpose of these reflectors 8 is to ensure that the maximum amount of ultraviolet radiation is directed into the liquid. Other reflector configurations are also possible, such as flat reflectors, however these have been found to be less effective at directing the ultraviolet radiation. The ultraviolet light sources may also be LEDs, which may be configured so that the radiation is emitted substantially in one direction, reducing the need for reflectors. In either case, it is preferable that the light path is as perpendicular to the water surface as possible so that as much light as possible enters the liquid without reflecting off the liquid surface.

It is possible to treat a liquid using a single ultraviolet light source. When a plurality of sources 5 are arranged in series, it is possible to adjust the dose provided to a liquid by turning on or off individual lamps while still irradiating the liquid evenly. This would not be possible in some prior art systems where the ultraviolet light sources are arranged parallel to the flow, as this would result in uneven treatment. The ultraviolet light sources 5 may be arranged in even or uneven intervals along the channel.

Because the flow in this device is in a uniform channel and the light source is from above then the penetration distance into the flow is far more uniform than in prior art where the light radiates from a tubular light source into a channel or circular vessel containing an array of similar light sources.

The embodiment shown in FIGS. 2 and 3 has a liquid inlet 9 to the apparatus designed so that a flow of constant pressure can be supplied into the system.

It is important that the channel and all surfaces that may reflect light are constructed from a material that is able to reflect ultraviolet radiation with high efficiency, so as to optimise the radiation that is absorbed by the liquid. For example, this may be achieved using polished aluminium and other metals.

Figure 4:
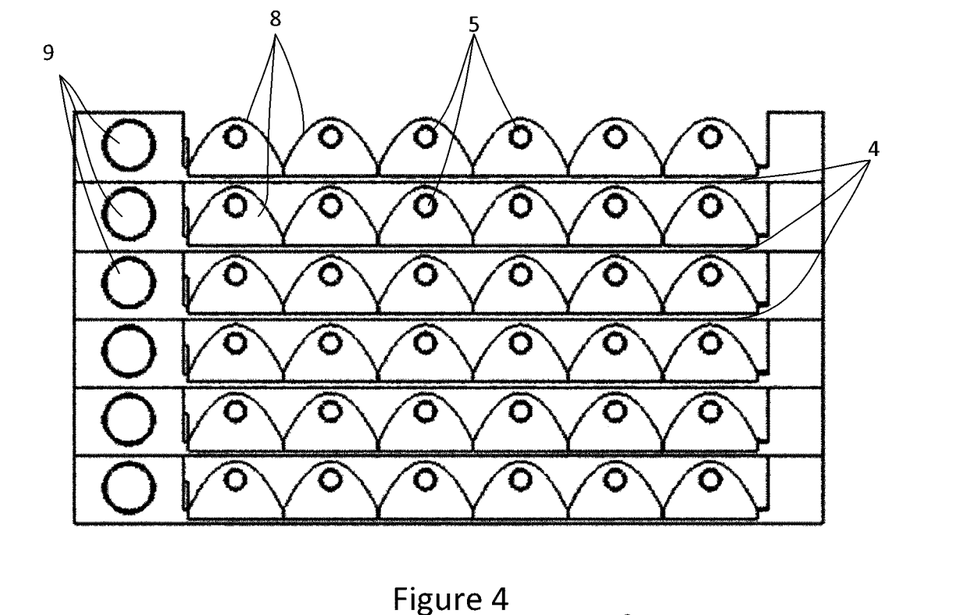
FIG. 4 is a cross-sectional side view of a liquid treatment apparatus according to a further embodiment.
Figure 5:
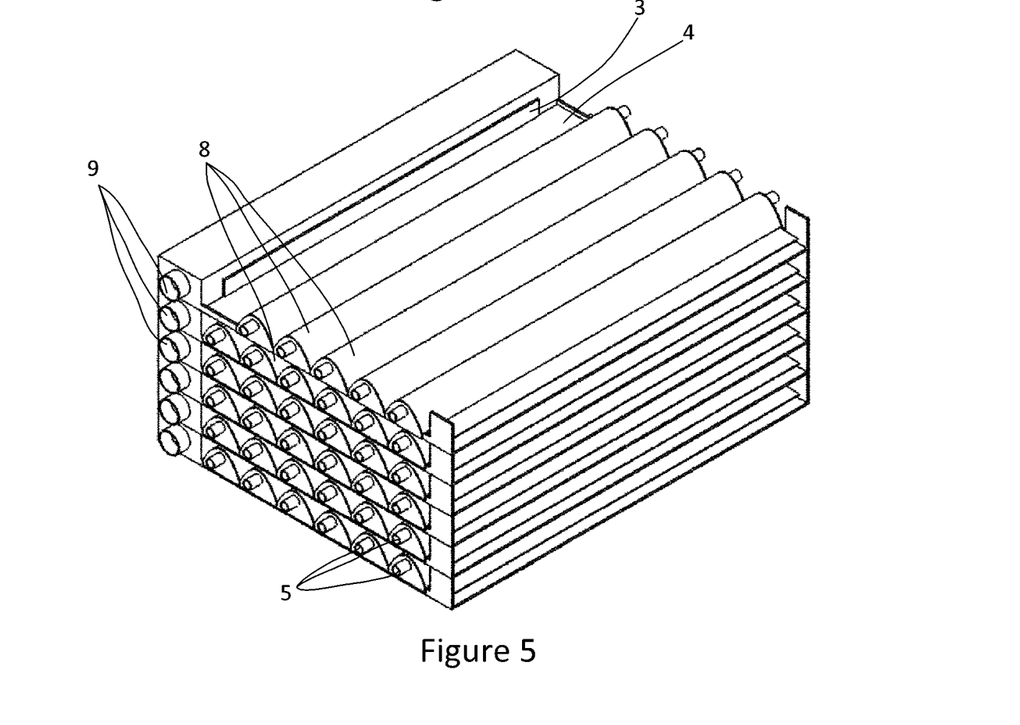
FIG. 5 is a perspective view of the liquid treatment apparatus shown in FIG. 4.

The open channel 4 has a flat bottom surface and vertical side walls, allowing several modules to be vertically stacked to increase treatment capacity while maintaining the same footprint as a single device. A stacked arrangement is shown in FIGS. 4 and 5 (the first bulb and reflector have been removed from FIG. 5 so that the gate is visible). It is possible that the stacked channels may be fed from a single reservoir or multiple reservoirs. The particular embodiment shown in FIGS. 4 and 5 has a series of liquid inlets 9 so that the apparatus can be supplied with a flow of constant pressure.

Figure 6:
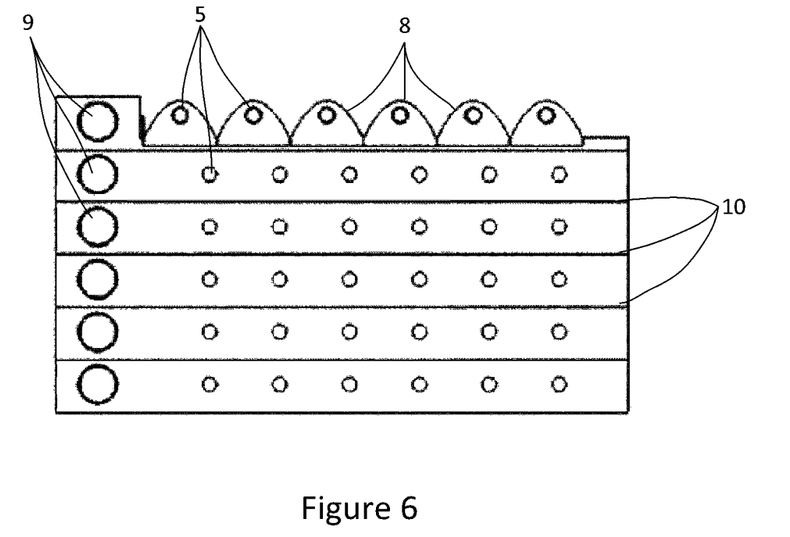
FIG. 6 is a cross-sectional side view of a liquid treatment apparatus according to a yet further embodiment.
Figure 7:
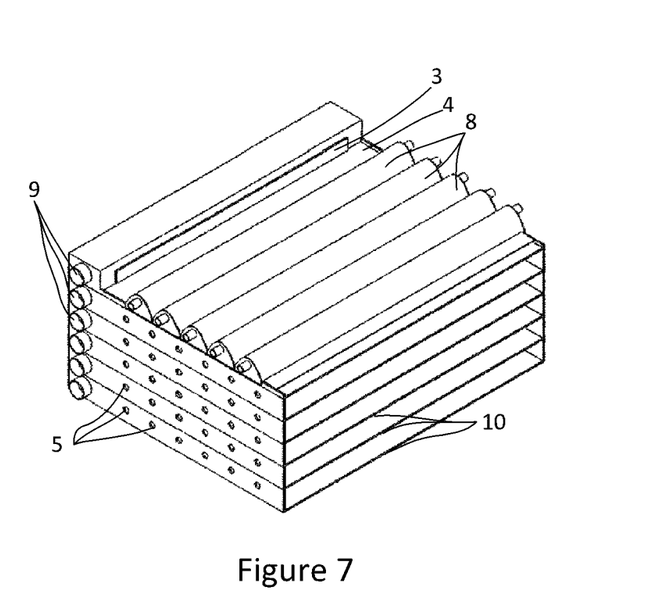
FIG. 7 is a perspective view of the liquid treatment apparatus shown in FIG. 6.

Rather than the typical metal base sheet, FIGS. 6 and 7 show a stacked embodiment in which at least a portion of the base of each channel 4 is formed of a material that transmits ultraviolet light well, such as a quartz sheet 10 (the first bulb and reflector have been removed from FIG. 7 so that the gate is visible). Other materials with high ultraviolet light transmittance may also be suitable. In this configuration parabolic reflectors 8 are only provided on the top layer and the light simply passes up and down through quartz layers 10 into the other channels. The light penetration from both sides of the flow effectively halves the depth and increases the ultraviolet light dose provided. It is also possible to provide a system with a single channel having a quartz base with two sets of ultraviolet light bulbs, one set above the channel and the other below. This would also allow the depth of the liquid being treated to effectively be halved due to irradiation from both sides. The sets of ultraviolet light bulbs would preferably be provided with parabolic reflectors to direct the radiation towards the liquid being treated.

Figure 8:
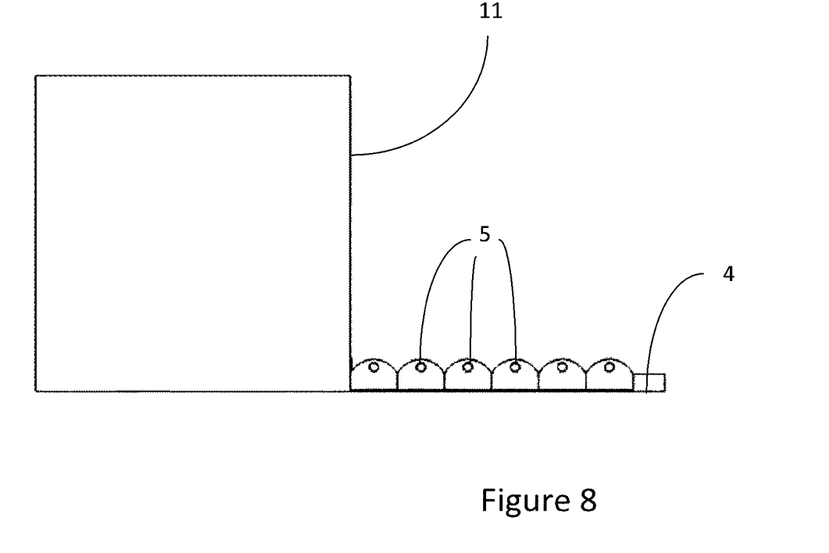
FIG. 8 is a cross-sectional side view of a liquid treatment apparatus according to a yet further embodiment.
Figure 9:
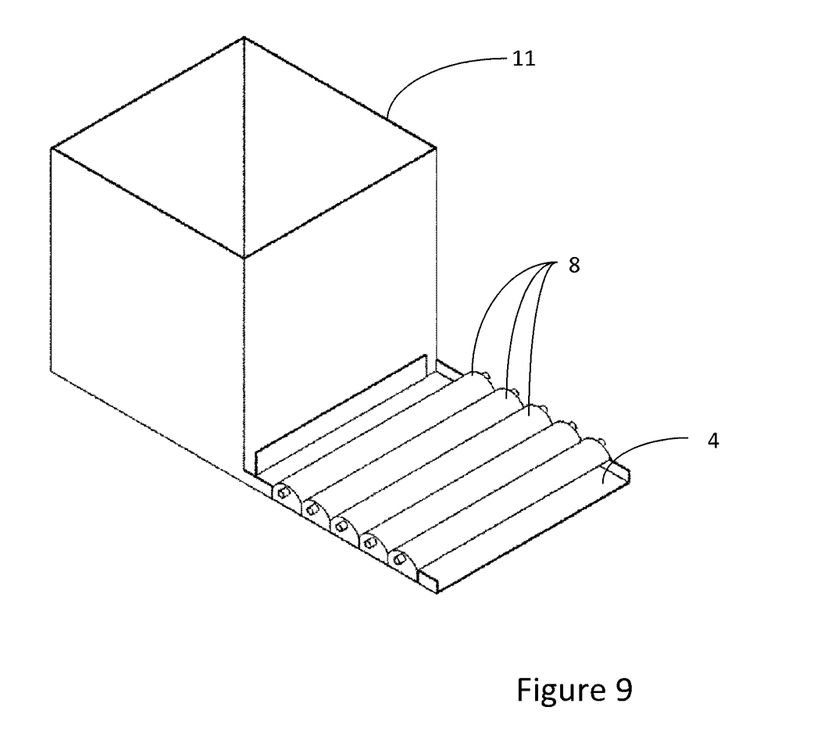
FIG. 9 is a perspective view of the liquid treatment apparatus shown in FIG. 8.

FIGS. 8 and 9 show a single level system similar to that shown in FIGS. 2 and 3 (like elements being given like numbers) except that a header tank 11 is used to provide a pressurised liquid source instead of providing a pressurised liquid source to inlet 9 as in the embodiment shown in FIGS. 2 and 3 (the first bulb and reflector have been removed from FIG. 9 so that the slot is visible). Where practical this avoids the need to provide a pump or other means to provide a pressurised liquid source.

In some cases, it may be preferable to use recycling with multiple treatment cycles or multiple treatment units in series where the output from one liquid treatment apparatus may be fed into another liquid treatment apparatus.

Compared to prior art systems, the present invention is very simple, inexpensive, easy to operate, has relatively low pressure losses, provides a high throughput and has been shown capable of providing superior treatment efficiency to some liquids, particularly those with low UV light transmissibility, thereby potentially allowing lower cost operation. The system allows independent adjustment of the depth of the flow of liquid to be treated and the speed of liquid flow to suit the particular properties of the liquid to be treated. The system may be driven by gravity head or pumped pressure and may be vertically stacked to reduce its footprint.

The system is particularly suitable for treating liquids such as domestic, commercial, industrial or agricultural (inclusive of but not limited horticulture or aquaculture) treated or untreated wastewaters. Other examples of suitable liquids include storm water, juices and other beverages, milk and other dairy products, viscous food pulps or other foodstuffs, and medical or nutritional products. The present invention is also capable of treating liquids without overexposure, as its hydraulic behaviour has a low dispersion number.

While the present invention has been illustrated by the description of the embodiments thereof, and while the embodiments have been described in detail, it is not the intention of the Applicant to restrict or in any way limit the scope of the appended claims to such detail. Additional advantages and modifications will readily appear to those skilled in the art. Therefore, the invention in its broader aspects is not limited to the specific details, representative apparatus and method, and illustrative examples shown and described. Accordingly, departures may be made from such details without departure from the spirit or scope of the Applicant's general inventive concept.

The invention claimed is:

1. A method of treating a liquid comprising the steps of:
   i. generating a thin flow of the liquid in a supercritical flow, having a Froude number greater than 3; and
   ii. irradiating the thin flow using at least one radiation source external to the thin flow.

2. A method of treating a liquid as claimed in claim 1 wherein the Froude number for the flow is greater than 5.

3. A method of treating a liquid as claimed in claim 1 wherein the Froude number for the flow is greater than 10.

4. A method of treating a liquid comprising the steps of:
   i. generating a thin flow of the liquid in a supercritical flow, and having a depth less than 6 mm; and
   ii. irradiating the thin flow using at least one radiation source external to the thin flow.

5. A method of treating a liquid according to claim 4 wherein the thin flow of liquid has a depth of less than 4 mm.

6. A method of treating a liquid according to claim 4 wherein the thin flow of liquid has a depth of about 2 mm.

7. A method of treating a liquid according to claim 2 wherein the thin flow of liquid has a depth of less than 2 mm.

8. A method of treating a liquid comprising the steps of:
   i. generating a thin flow of the liquid in a supercritical flow, and having a velocity greater than 0.8 m/s; and
   ii. irradiating the thin flow using at least one radiation source external to the thin flow.

9. A method as claimed in claim 8 wherein the thin flow has a velocity greater than 1 m/s.

10. A method as claimed in claim 8 wherein the thin flow has a velocity greater than 2.5 m/s.

11. A method of treating a liquid according to claim 1 wherein the thin flow is generated by restricting the flow of the liquid from a liquid source.

12. A method as claimed in claim 11 wherein the thin flow is produced by one or more aperture in a barrier between the liquid source and the thin flow.

13. A method of treating a liquid according to claim 12 wherein the thin flow is produced by a sluice gate or slot that is arranged to eject the liquid as a thin flow.

14. A method of treating a liquid according to claim 1 wherein the thin flow is directed along an open channel.

15. A method of treating a liquid according to claim 1 wherein the step of irradiating the liquid uses one or more ultraviolet radiation sources.

16. A method of treating a liquid according to claim 1 wherein one or more reflectors are used to direct the radiation towards the thin flow.

17. An apparatus for treating a liquid including:
   i. a liquid source;
   ii. an open channel;
   iii. a slot having a height of 6 mm or less from the liquid source to the open channel configured to generate a thin flow of liquid having a supercritical flow along the channel; and
   iv. at least one radiation source external to the thin flow to irradiate the thin flow.

18. An apparatus for treating a liquid according to claim 17 including one or more ultraviolet radiation sources.

19. An apparatus for treating a liquid according to claim 17 wherein one or more reflectors are used to direct the radiation towards the thin flow.

20. An apparatus as claimed in claim 17 wherein at least a portion of the base of the channel is formed of a material having high ultraviolet light transmittance with ultraviolet light sources positioned underneath so as irradiate the flow from below.

21. A treatment system including a plurality of apparatus as claimed in claim 17 arranged in a stacked arrangement.

22. A treatment system as claimed in claim 21 wherein at least a portion of the base of one or more channel is formed of a material having high ultraviolet light transmittance with at least some of the ultraviolet light sources positioned underneath so as irradiate the flow from below.

23. A treatment system as claimed in claim 22 wherein at least some of the ultraviolet light sources are arranged to irradiate both a flow above and a flow below those ultraviolet light sources.

24. A method of treating a liquid according to claim 4 wherein the thin flow is generated by restricting the flow of the liquid from a liquid source.

25. A method as claimed in claim 24 wherein the thin flow is produced by one or more aperture in a barrier between the liquid source and the thin flow.

26. A method of treating a liquid according to claim 25 wherein the thin flow is produced by a sluice gate or slot that is arranged to eject the liquid as a thin flow.

27. A method of treating a liquid according to claim 24 wherein the thin flow is directed along an open channel.

28. A method of treating a liquid according to claim 24 wherein the step of irradiating the liquid uses one or more ultraviolet radiation sources.

29. A method of treating a liquid according to claim 24 wherein one or more reflectors are used to direct the radiation towards the thin flow.

30. A method of treating a liquid according to claim 8 wherein the thin flow is generated by restricting the flow of the liquid from a liquid source.

31. A method as claimed in claim 30 wherein the thin flow is produced by one or more aperture in a barrier between the liquid source and the thin flow.

32. A method of treating a liquid according to claim 31 wherein the thin flow is produced by a sluice gate or slot that is arranged to eject the liquid as a thin flow.

33. A method of treating a liquid according to claim 30 wherein the thin flow is directed along an open channel.

34. A method of treating a liquid according to claim 30 wherein the step of irradiating the liquid uses one or more ultraviolet radiation sources.

35. A method of treating a liquid according to claim 30 wherein one or more reflectors are used to direct the radiation towards the thin flow.

36. A method of treating a liquid comprising the steps of:
   i. generating a thin flow of the liquid in a supercritical flow; and
   ii. irradiating the thin flow using at least one radiation source external to the thin flow.

37. A method of treating a liquid according to claim 36 wherein the thin flow has a depth less than 6 mm.

\* \* \* \* \*